US009383057B2

(12) United States Patent
Daczko et al.

(10) Patent No.: US 9,383,057 B2
(45) Date of Patent: Jul. 5, 2016

(54) SYSTEMS AND METHODS FOR REPOSITIONING OBJECTS

(71) Applicants: Mateus Daczko, Olympia, WA (US); Gordon W. Brown, Colorado Springs, CO (US)

(72) Inventors: Mateus Daczko, Olympia, WA (US); Gordon W. Brown, Colorado Springs, CO (US); Robert Rendle, Columbus, GA (US); Eric Boe, Newberg, OR (US)

(73) Assignees: Mateus Daczko, Olympia, WA (US); Gordon W. Brown, Colorado Springs, CO (US)

( * ) Notice: Subject to any disclaimer, the term of this patent is extended or adjusted under 35 U.S.C. 154(b) by 0 days.

(21) Appl. No.: 14/485,557

(22) Filed: Sep. 12, 2014

(65) Prior Publication Data

US 2015/0071757 A1  Mar. 12, 2015

(51) Int. Cl.

| F16M 11/18 | (2006.01) |
|---|---|
| F25D 29/00 | (2006.01) |
| F25D 25/02 | (2006.01) |
| F16M 11/04 | (2006.01) |

(52) U.S. Cl.
CPC ............ *F16M 11/18* (2013.01); *F16M 11/045* (2013.01); *F16M 11/048* (2013.01); *F25D 25/02* (2013.01); *F25D 29/003* (2013.01); *F25D 2325/00* (2013.01); *F25D 2500/06* (2013.01); *F25D 2600/00* (2013.01)

(58) Field of Classification Search
CPC .. B65G 2209/04; B65G 67/603; B60L 13/10; G06Q 10/08; G06Q 50/28
USPC ............ 104/281, 283; 108/143, 21; 198/619; 269/8; 273/153 S; 310/12.05, 12.06, 310/12.27; 312/408; 40/426; 414/236, 239, 414/246, 258, 264, 273, 279, 280, 286; 700/214, 215, 242, 243; 74/490.09, 74/89.32

See application file for complete search history.

(56) References Cited

U.S. PATENT DOCUMENTS

| 2,144,835 | A | * | 1/1939 | Dickinson ...................... 108/21 |
|---|---|---|---|---|
| 5,267,732 | A | * | 12/1993 | Bowen et al. ............... 273/153 S |
| 5,711,160 | A | | 1/1998 | Namisniak et al. |
| 6,285,102 | B1 | * | 9/2001 | Matsuoka et al. .............. 310/90 |
| 6,290,056 | B1 | * | 9/2001 | Ootsuki et al. ................ 198/619 |
| 6,842,665 | B2 | * | 1/2005 | Karlen .......................... 700/217 |
| 7,123,988 | B2 | * | 10/2006 | Russell et al. ................ 700/217 |
| 7,196,625 | B1 | | 3/2007 | Nguyen |
| RE41,760 | E | * | 9/2010 | Thompson et al. ........... 198/619 |
| 7,815,031 | B2 | * | 10/2010 | Schneider ................... 198/347.1 |
| 8,217,538 | B2 | * | 7/2012 | Shoda et al. ............... 310/12.31 |
| 8,321,302 | B2 | | 11/2012 | Bauer et al. |
| 2007/0023512 | A1 | | 2/2007 | Miller et al. |
| 2010/0052909 | A1 | * | 3/2010 | Doan et al. .................. 340/572.1 |
| 2010/0187306 | A1 | * | 7/2010 | Solomon ....................... 235/385 |
| 2010/0236445 | A1 | * | 9/2010 | King et al. ............... 104/130.03 |
| 2012/0212149 | A1 | * | 8/2012 | Forster et al. ................. 315/246 |

* cited by examiner

*Primary Examiner* — Saul Rodriguez
(74) *Attorney, Agent, or Firm* — Seed IP Law Group PLLC

(57) ABSTRACT

Systems for repositioning objects, such as, for example, food items in a refrigerator, are provided. The systems may include a platform having a support surface upon which the objects are supported, an electromagnet positioned beneath the platform, a motion system coupled to electromagnet, and a control system electronically and/or communicatively coupled to the motion system and the electromagnet. The control system may be configured to controllably move the electromagnet beneath the support surface and to selectively activate and deactivate the electromagnet in coordination with said movement to reposition the objects. Related methods of repositioning objects are also provided.

20 Claims, 7 Drawing Sheets

SYSTEMS AND METHODS FOR REPOSITIONING OBJECTS

BACKGROUND

1. Technical Field

This disclosure generally relates to systems and methods for repositioning objects, such as, for example, food items in a refrigerator.

2. Description of the Related Art

There are systems and related methods for managing food items in an effort to ensure consumption prior to spoliation or expiration of the useful storage life of such items. For example, U.S. Pat. No. 5,711,160 discloses a food storage tracking system that includes functionality to track the possible expiration of food items and alert a user to the same in an effort to encourage consumption of such food items in a timely manner. As another example, U.S. Pat. No. 7,196,625 also discloses a food management system that includes functionality to track the possible expiration of food items and alert a user to the same in an effort to encourage consumption of such food items in a timely manner.

Such systems, however, suffer from a variety of drawbacks, including, for example, the need to manually locate food items of interest for consumption, use or disposal.

BRIEF SUMMARY

Embodiments of the systems and methods described herein provide for the rearrangement of food items or other objects to facilitate consumption, use or disposal of the same. For example, food items with a relatively short remaining shelf life may be positioned nearer to the front of a refrigerator to enhance visibility and access of such food items.

In one aspect, a system for repositioning objects may include: a platform having a support surface upon which the objects are supported; an electromagnet positioned beneath the platform; a motion system coupled to electromagnet; and a control system electronically and/or communicatively coupled to the motion system and the electromagnet. The control system may be configured to controllably move the electromagnet beneath the support surface and to selectively activate and deactivate the electromagnet in coordination with said movement to reposition the objects. The motion system may also include a carriage that is movable in translational directions orthogonal to each other.
Electrically The system may further include a plurality of tiles arranged on the support surface, and the control system may be configured to controllably rearrange the plurality of tiles on the support surface. The plurality of tiles may be arranged in a matrix of rows and columns, and at least one space may be provided to enable rearrangement of the tiles relative to each other. Each tile may include a target that is biased away or towards the electromagnet when the electromagnet is activated to enable manipulation of the tile when the electromagnet moves in proximity to the target. The control system may be configured to move the electromagnet in close proximity to a select tile and to propel or draw the tile across the support surface to reposition the tile.

A friction reducing agent may be provided between the plurality of tiles and the support surface of the platform. Each tile may also include a friction reducing arrangement on a lower surface thereof. In some instances, each tile may include a plurality of targets each oriented in a different direction. Each target may be a magnet with magnetic poles oriented at an incline relative to a plane defined by the support surface.

The system may further include a plurality of tags, each tag being configured to communicate wirelessly with the control system and being selectively attachable to a respective object. Each tag may include an indicator configured to provide an indication of a quality or characteristic of the object to which the tag is attached or otherwise associated. The indicator of each tag may be, for example, an LED configured to emit a plurality of colors. Each color may be indicative of a different degree or state of the quality or characteristic of the object to which the tag is attached. In other instances, the tag may include a display (e.g., a display screen) for displaying an indication of a quality or characteristic of the object to which the tag is attached or otherwise associated.

In some instances, the control system may be configured to detect a respective location of each tag of the system that is coupled to a respective object supported by the platform. The control system may be configured to move a tile supporting an object from a first location to a second location based at least in part on a quality or characteristic of the object. The control system may be configured to rearrange a tile supporting an object among a plurality of tiles supporting other objects based at least in part on a comparison of a quality or characteristic of the object to a corresponding quality or characteristic of at least one other object. The object to be repositioned may be a food item and the control system may be configured to rearrange the tile supporting the food item among a plurality of tiles based at least in part on a comparison of age or expiration data of the food item to corresponding age or expiration data of at least one other food item.

The motion system, the electromagnet and the platform may be integrated as a unit, such as a shelf unit, and installed or provided in an appliance (e.g., fridge) or a fixture (e.g., cabinet, shelving unit, product display fixture).

In another aspect, a refrigerator may be provided comprising: a control system (or portion of a control system) and a shelf unit that includes a platform having a support surface upon which food items may be supported, an electromagnet positioned beneath the platform, and a motion system coupled to electromagnet. The control system is electronically and/or communicatively coupled to the motion system and the electromagnet of the shelf unit and configured to controllably move the electromagnet beneath the support surface and to selectively activate and deactivate the electromagnet in coordination with said movement to reposition food items (or other items) within the refrigerator. The control system may include a wireless communication system to receive signals from a remote controller to enable remote controlled operation of the shelf unit. The remote controller may comprise, for example, a computing device (e.g., smart phone) communicatively coupled to the internet, such as, for example, via a Wi-Fi or other network. In this manner, a user may control aspects of the refrigerator using his or her smart phone or a similar computing device. The smart phone or other computing device may include appropriate software application that is configured to enable remote control of the refrigerator or features thereof.

In another aspect, a system for repositioning objects includes a platform having a support surface upon which the objects are supported, an arrangement of electromagnets positioned beneath the platform, and a control system electronically and/or communicatively coupled to the arrangement of electromagnets, the control system being configured to selectively activate and deactivate the electromagnets in a sequence to impart motion to one or more of the objects. The system may further include a plurality of tiles arranged on the support surface, and the control system may be configured to controllably rearrange the plurality of tiles on the support surface by sequencing the activation and deactivation of at least some of the electromagnets in the arrangement of electromagnets.

In another aspect, a method of reorganizing objects includes moving a tile supporting at least one object among a matrix of tiles from a first position to a second position based at least in part on a quality, a characteristic or an identity of the object. Moving the tile may comprise manipulating the tile on a support surface by applying a magnetic bias to the object.

DETAILED DESCRIPTION

In the following description, certain specific details are set forth in order to provide a thorough understanding of various disclosed embodiments.

However, one skilled in the relevant art will recognize that embodiments may be practiced without one or more of these specific details, or with other methods, components, materials, etc. In other instances, well-known structures associated with motion systems and control systems have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Embodiments disclosed herein provide systems and methods that are particularly well suited to facilitate and encourage the timely consumption of perishable food items. In other instances, the systems and methods may be used to reposition objects to be displayed based on other characteristics or conditions. For example, food items may be repositioned based on the food items corresponding to a particular recipe. As another example, consumer goods may be repositioned based on the goods being subject to a specific promotion or sale.

Figure 1:
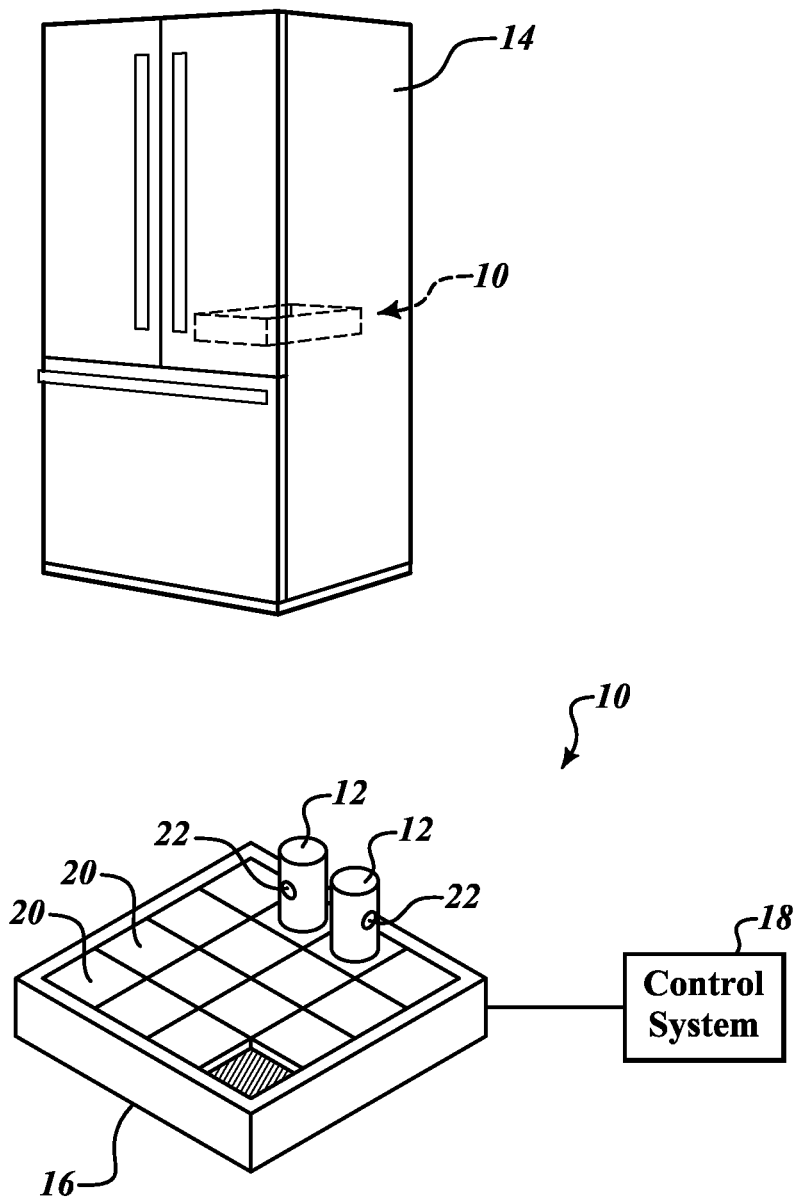
FIG. 1 is a perspective view of a system for repositioning objects, according to one embodiment.

FIG. 1 shows an example embodiment of a management system 10 for repositioning objects 12. The management system 10 may be incorporated in a refrigerator 14 or other appliance or fixture. The management system 12 includes a mechanical system 16 and a control system 18 electrically and/or communicatively coupled to the mechanical system 16. As an example, the mechanical system 16 may be an integrated shelf unit that may serve as a suitable replacement for conventional shelves in a refrigerator. According to the illustrated embodiment of FIG. 1, the mechanical system 16 includes a plurality of repositionable tiles 20 upon which one or more of the objects 12 (e.g., food items) may be supported. In some instances, each object 12 may be provided with a respective tag 22 to enable various aspects of the functionalities described herein.

Figure 2:
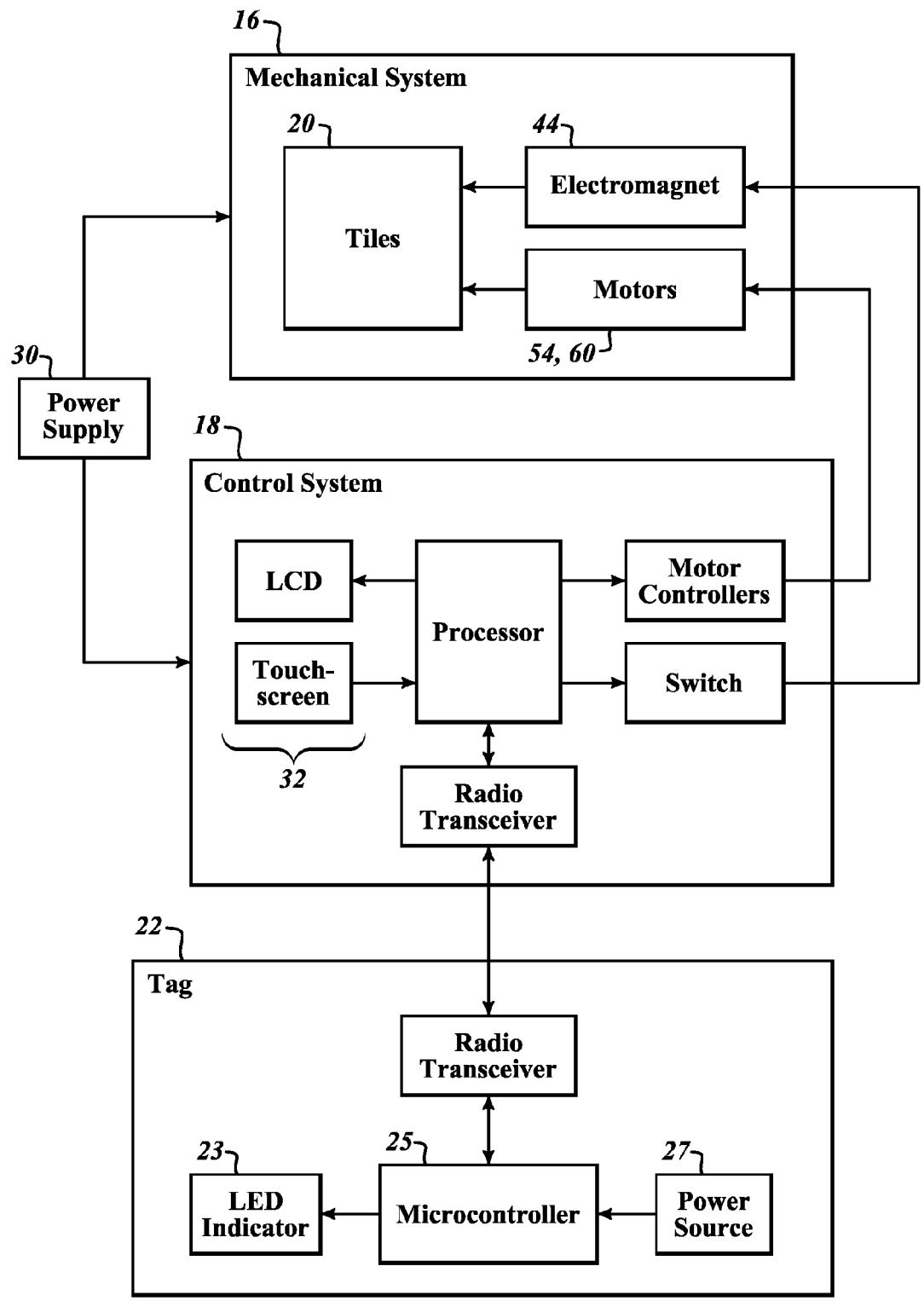
FIG. 2 is a schematic view of the system for repositioning objects of FIG. 1, showing addition aspects of the system.

FIG. 2 is a schematic representation of the management system 10 shown in FIG. 1. The control system 18 may include, without limitation, one or more processors, microprocessors, digital signal processors (DSPs), field programmable gate arrays (FPGA), and/or application-specific integrated circuits (ASICs), memory devices, buses, power sources, and the like. For example, the control system 18 can include a processor in communication with one or more memory devices. Buses can link an internal or external power supply 30 to the processor. The same or a different power supply 30 may also be provided to provide power for the mechanical system 16. The memories may take a variety of forms, including, for example, one or more buffers, registers, random access memories (RAMs), and/or read only memories (ROMs). The control system 18 may also include various input and output devices, such as, for example, a display, a keyboard, touchpad, or the like providing a user interface 32 and can be operated by a user to control or otherwise interact with the management system 10. The control system 18 may my communicatively coupled to the mechanical system 16 as well as to a plurality of tags 22 as discussed in greater detail elsewhere to enable the functionalities described herein. In some instances, the control system 18 may include wireless communication functionality and a remote controller to enable remote controlled operation of aspects of the mechanical system 16. The remote controller may comprise, for example, a computing device (e.g., a smart phone) communicatively coupled to the internet, such as, for example, via a Wi-Fi or other network. In this manner, a user may control aspects of the management system 10 using his or her smart phone or similar computing device. The smart phone or other computing device may include appropriate software that is configured to enable such remote control of the management system 10 or features thereof. In other instances, aspects of the control system 18, including input and output devices, may be integrated into the refrigerator 14 or other appliance or fixture to enable control of the management system 10 or aspects thereof directly from the refrigerator 14 or other appliance or fixture.

Figure 3:
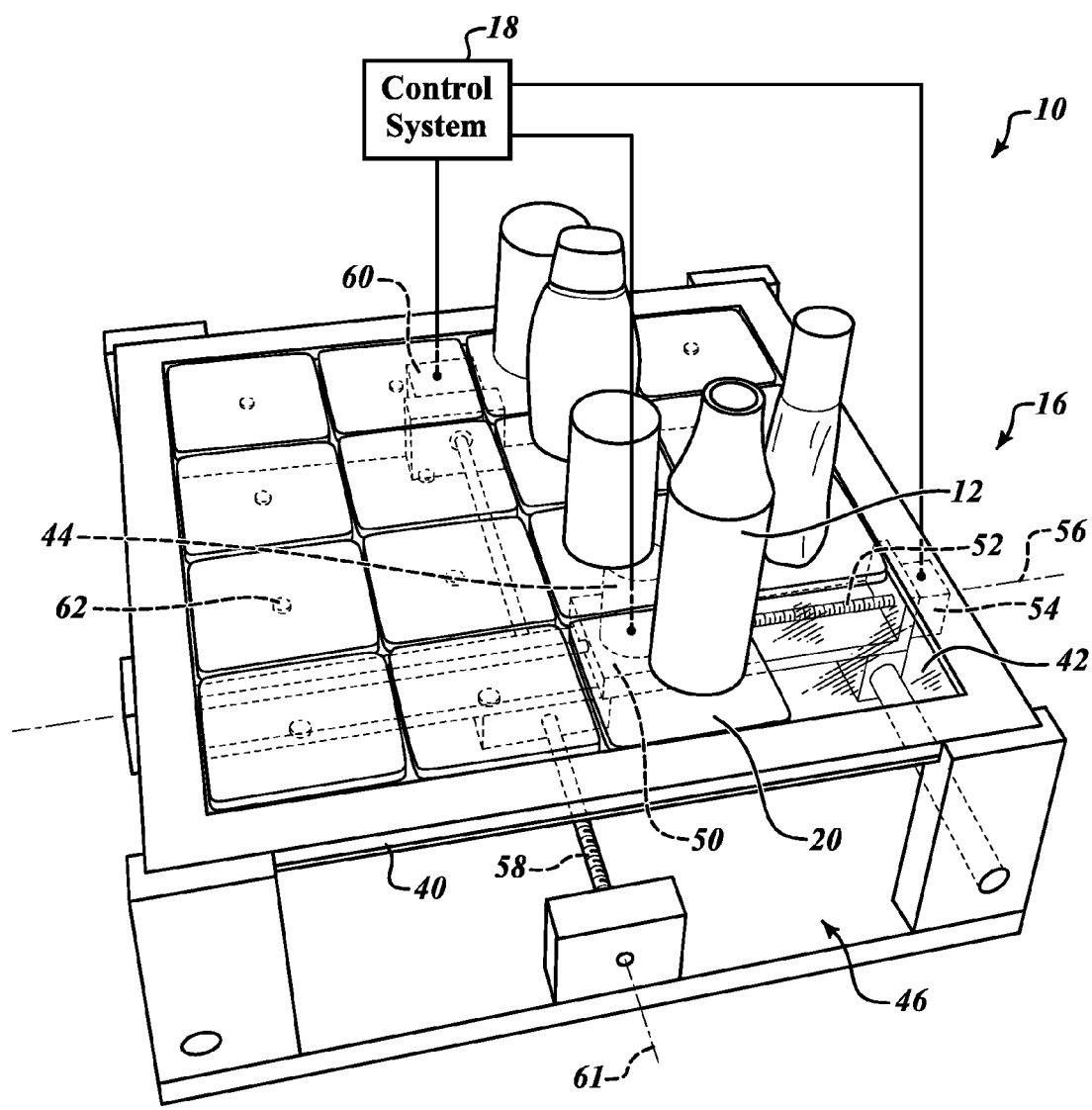
FIG. 3 is a perspective view of a system for repositioning objects, according to one example embodiment.
Figure 4:
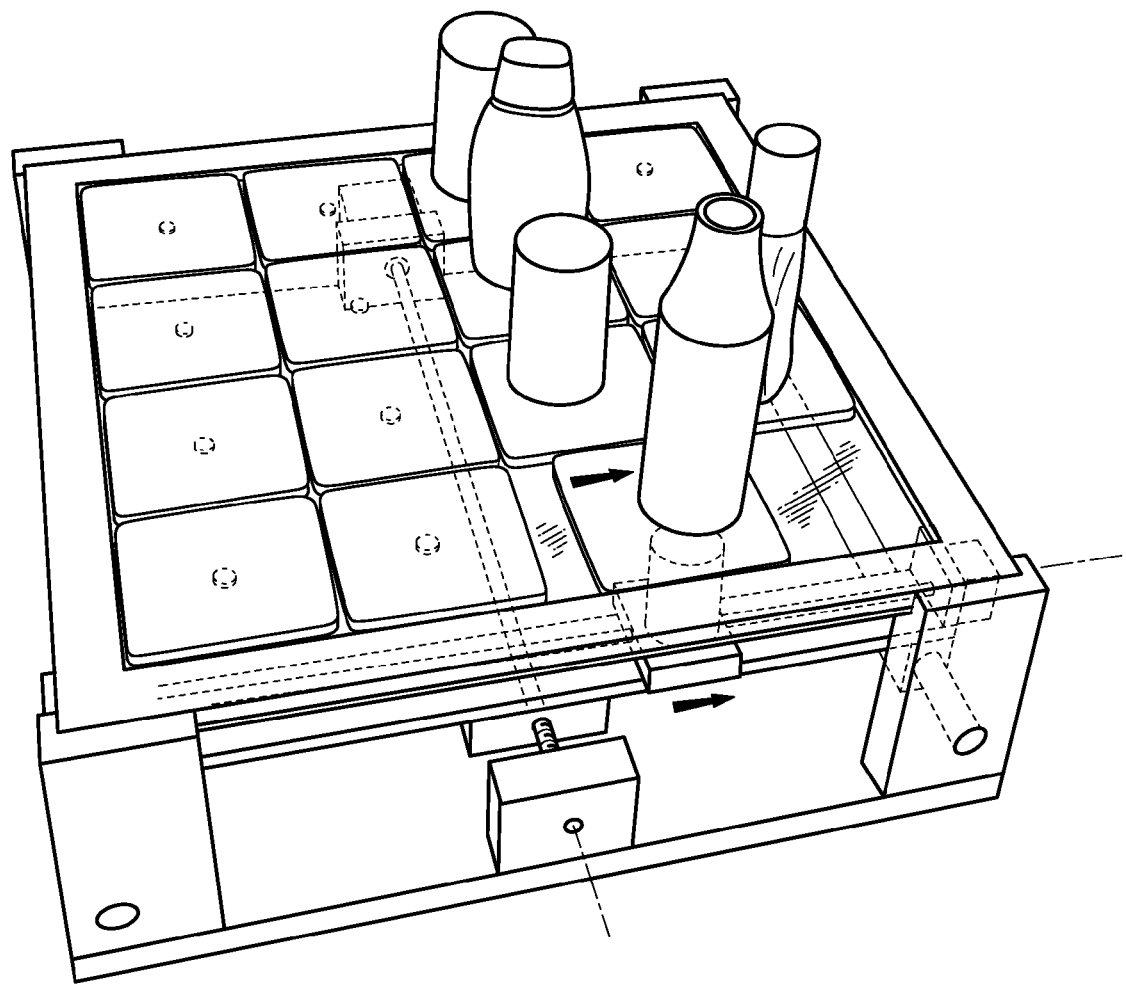
FIG. 4 is a perspective view of the system for repositioning objects of FIG. 3 with a select tile thereof moving to a new position.
Figure 5:
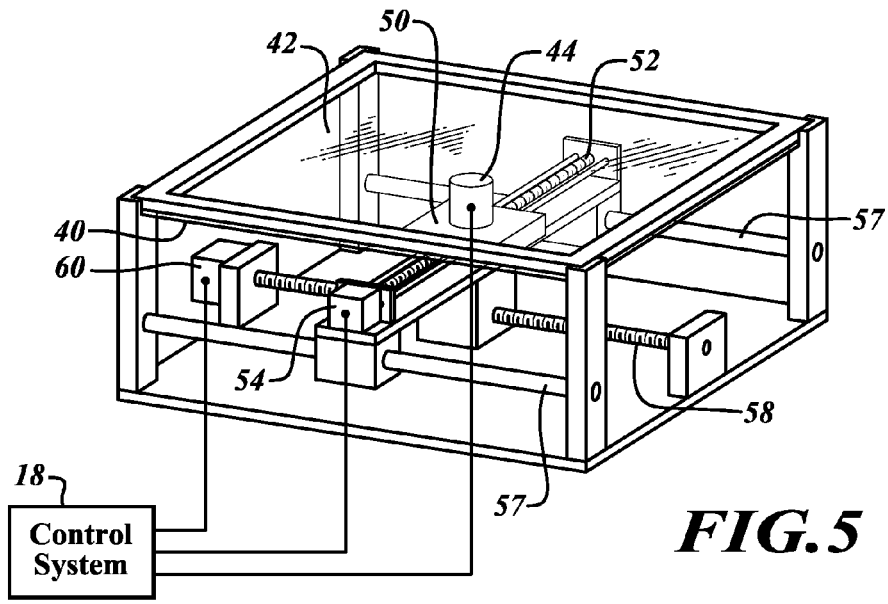
FIG. 5 is a further perspective view of the system for repositioning objects shown in FIGS. 3 and 4 without the tiles or objects supported thereon.

FIGS. 3 through 5 show aspects of an example management system 10 for repositioning objects, according to one embodiment. The system 10 includes a platform 40 having a support surface 42 upon which the objects 12 are supported. An electromagnet 44 is positioned beneath the platform 40 and is preferably supported in close proximity thereto. A motion system 46 is coupled to the electromagnet 44 and enables the electromagnet 44 to be moved beneath the platform 40. A control system 18 is electronically and/or communicatively coupled to the motion system 46 and the electromagnet 44 and is configured to controllably move the electromagnet 44 beneath the support surface 42 and to selectively activate and deactivate the electromagnet 44 in coordination with said movement to reposition the objects 12.

As an example, the motion system 46 may include a carriage 50 which is movable in translational directions orthogonal to each other. More particularly, a first lead screw 52 and associated motor 54 may be provided to drive the carriage 50 back and forth along one translational axis 56 and a second lead screw 58 and associated motor 60 may be provide to drive an assembly comprising the carriage 50, the first lead screw 52, and associated motor 54 back and forth along another translational axis 61 that is perpendicular to the other translational axis 56. The assembly comprising the carriage 50, the first lead screw 52, and associated motor 54 move back and forth along associated rails 57. Although the motion system 46 is shown as including perpendicularly aligned lead screw arrangements, it is appreciated that other positioning mechanisms may be used in connection with the embodiments described herein, such as, for example, various linear positioners or actuators and/or linear or rotary stages.

With continued reference to FIGS. 3 through 5, a plurality of tiles 20 may be arranged on the support surface 42 of the platform 40. More particularly, the plurality of tiles 20 may be arranged in a matrix of rows and columns with at least one space provided to enable rearrangement of the tiles 20 relative to each other, similar to a sliding puzzle. For example, fifteen like tiles 20 may be arranged in a 4×4 matrix, leaving one empty space to enable rearrangement of the tiles 20 relative to each other.

Each tile 20 may include a target 62, such as an embedded magnet or ferrous mass, that may be selectively biased away or towards the electromagnet 44 when the electromagnet 44 is activated. Advantageously, this can enable manipulation of the tile 20 when the electromagnet 44 moves in proximity to the target 62. For example, the electromagnet 44 may be brought beneath a tile 20 but offset from the target 62 thereof, activated and then moved toward the target 62 to push or propel the target 62 and hence tile 20 in a desired direction. As another example, the electromagnet 44 may be brought beneath a tile 20 but offset from the target 62 thereof, activated with alternative polarity and then moved away from the target to pull or draw the target 62 and hence tile 20 in a desired direction.

The control system 18 may be configured to move any given tile 20 from one cell in the matrix to another cell in the matrix based on various criteria and data, such as, for example, shelf life expectancy data. For example, a tile 20 supporting a product with a relatively short remaining shelf life may be given priority and may be moved to a new position that is more accessible or visible to a user, thereby encouraging consumption, use or disposal of said item. Objects 22, such as food items, may be arranged in accordance with remaining shelf life or some other characteristic or data relating to shelf life. In other instances, objects 22, such as food items, may be arranged in accordance with a list of associated items, such as a recipe. For example, food items needed for a particular recipe may be relocated to a relatively more accessible location based on an indication by a user reflecting the desire to prepare a food dish based on said recipe.

Figure 6:
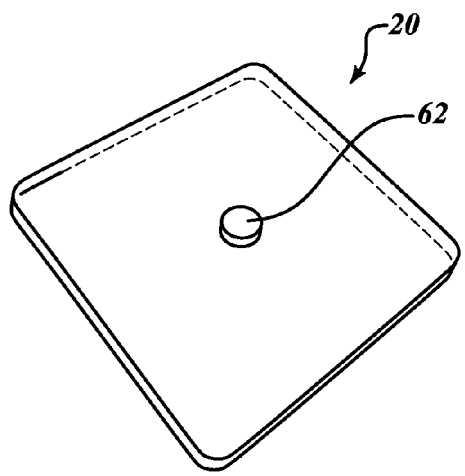
FIG. 6 is a perspective view of a tile, according to one embodiment, usable with the systems for repositioning objects described herein.

To assist in rearranging the tiles 20, a friction reducing agent, such as a wax or other agent, may be provided between the plurality of tiles 20 and the support surface 42 of the platform 40. In addition, each tile 20 may include a friction reducing arrangement on a lower surface thereof. For example, small protrusions 19 (FIG. 7) may be provided on the lower surface of the tile 20 to reduce or minimize contact between the tile 20 and the support surface 42. FIG. 6 shows an example embodiment of a tile 20 usable in connection with the systems and methods for repositioning objects 12 described herein. The tile 20 is shown as a square having approximately a 5"×5" profile, rounded corners and a thickness of about ½". A target 62 is provided in the form of a neodymium magnet at the center of the tile 20 to selectively interact with the aforementioned electromagnet 44. Although only a single target 62 is shown in the example tile 20 of FIG. 6, it is appreciated that in other embodiments a plurality of targets 62 may be provided. In addition, each of the plurality of targets may be oriented in a different direction to enhance the motive force that arises from the interaction of the targets with the electromagnet 44 during operation. For example, each of four targets may be provided to interact with the electromagnet 44 in one of four primary directions. In some instances, each target may be a magnet aligned with its magnetic poles oriented at an incline relative to a plane defined by the support surface 42.

Figure 7:
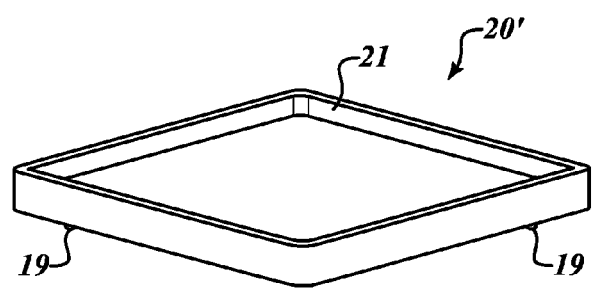
FIG. 7 is an isometric view of a tile, according to another embodiment, usable with the systems for repositioning objects described herein.
Figure 8A:
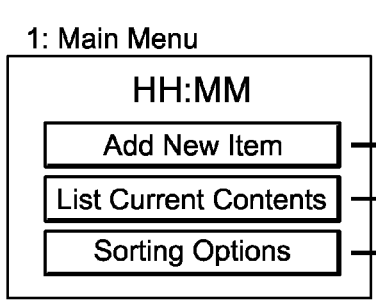
FIGS. 8A-8J show aspects of a user interface, according to an example embodiment.
Figure 8B:
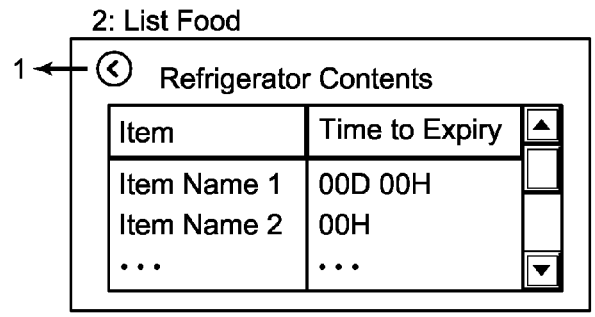
Figure 8C:
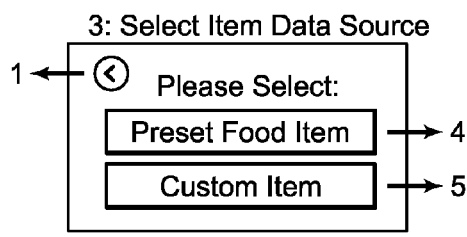
Figure 8D:
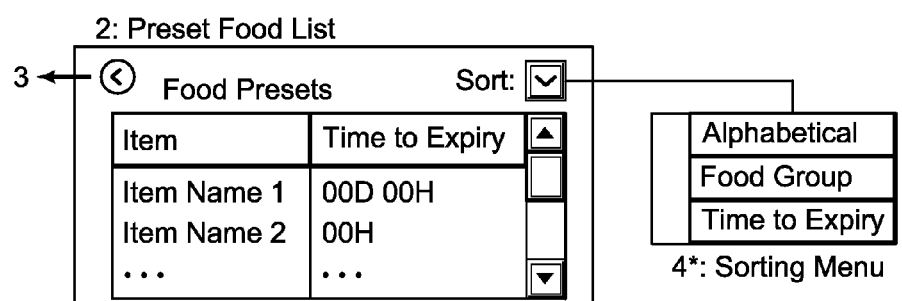
Figure 8E:
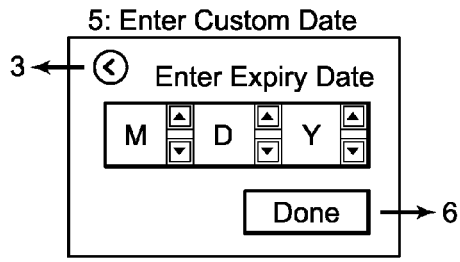
Figure 8F:
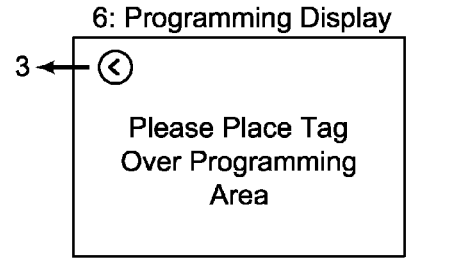
Figure 8G:
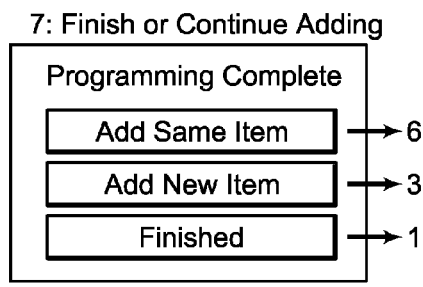
Figure 8H:
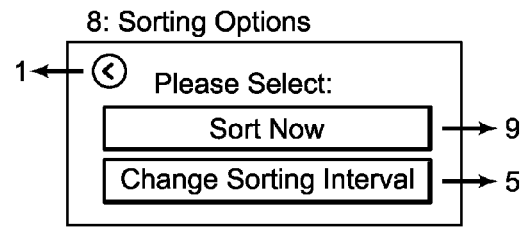
Figure 8I:
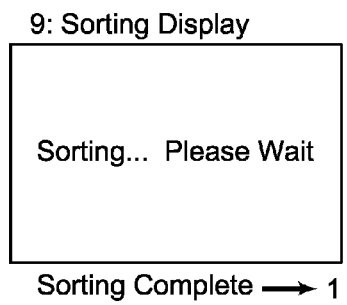
Figure 8J:
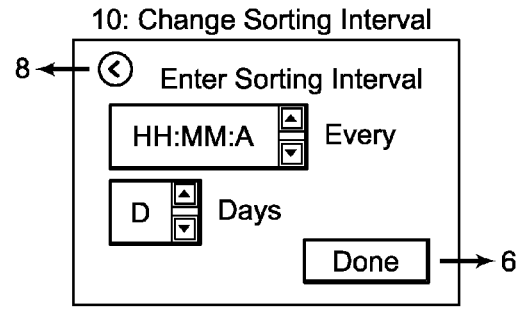

FIG. 7 shows another example embodiment of a tile 20' usable in connection with the systems and methods for repositioning objects 12 described herein. The tile 20' includes a raised or upstanding lip 21 around a perimeter thereof to assist in maintaining objects 12 on the tile 20' throughout movement of said tile 20'. The tile 20' also includes small protrusions 19 on a lower surface of the tile 20' to reduce or minimize contact between the tile 20' and the support surface 42.

To enable some of the functionality described herein, the system 10 may further include a plurality of tags 22. Each tag 22 may be configured to communicate wirelessly with the control system 16, such as, by way of a radio transceiver or other wireless communication device. The tags 22 may be selectively attachable to a respective object 12. For example, the tags 22 may be adhered, clipped, snapped or otherwise fastened to a respective object 12. Preferably, the tags 22 are removably coupled to the objects 12 to facilitate reuse of the same. Alternatively, the tags 22 may be provided with or otherwise embedded or fixed to the objects 12, such as, for example, in the case of objects which may be provided with RFID tags.

Each tag 22 may include an indicator 23, such as, for example, an LED, which is configured to provide an indication of a quality or characteristic of the object 12 to which the tag 22 is attached. For example, the indicator 23 of each tag 22 may be an LED that is configured to emit a plurality of colors with each color being indicative of a different degree or magnitude of the quality or characteristic of the object to which the tag 22 is attached. For example, green may indicate a "new" or "fresh" state, yellow may indicate an "expiring soon" or "ageing" state, and red may indicate an "expired," "stale" or "spoiled" state. Each tag 22 may further include a microcontroller 25 and a power source 27 for enabling controlled operation of the indicator 23. The tag 22 may be associated with a specific product and assigned an expiration date or time. The control system 18 may track the expiration dates associated with each tag 22 and hence objects 12 and periodically communicate updates to the tags 22 to be reflected by the indicator 23. The tags 22 may also be interrogated by or otherwise communicate with the control system 18 to enable detection of a respective location of each tag 22 and hence object 12 supported by the system 10. The control system 16 may then be configured to move a tile 20 supporting a particular object (e.g., a specific perishable food item) from a first location, such as a rear position, to a second location, such as a front location, based at least in part on a quality or characteristic of the object, such as, for example, its remaining shelf life. The control system 16 is able to rearrange the tile 20 among a plurality of tiles 20 supporting other objects 12 based at least in part on a comparison of said quality or characteristic of the object 12 to a corresponding quality or characteristic of the other objects. Using an advanced algorithm, the system 10 can find a way to reorganize the objects 12 so that the objects 12 that are closest to expiration, for example, are put as close to a front position as possible, to encourage use or consumption of the objects 12 before they go to waste. Objects, such as spoiled food items, may also be brought to a front position or disposal position to promote timely disposal.

FIGS. 8A-8J show aspects of an example embodiment of a user interface that may be used in connection with the systems 10 described herein. The interface is particularly adapted for assigning expiration data to perishable food items; however, it will be appreciated by those of ordinary skill in the art that a similar interface may be providing in connection with the reorganization and management of other objects besides perishable food items based on a wide variety of characteristics, qualities and/or conditions of said objects. In some instances, the user interface may be provided via a display unit integrated into an appliance or fixture containing the mechanical system 16. In some instances, the user interface may be provided via a computing device (e.g., a smart phone) distinct from an appliance or fixture containing the mechanical system 16.

Although the structure illustrated in FIGS. 3 through 5 is shown as a skeletal frame, it is appreciated that the motion system 46, the electromagnet 44 and the platform 40 may be integrated as a unit, such as, for example a closed or sealed unit that is provided with appropriate electrical connectors for power supply and electrical communication (in some instances) with the mechanical system 16 and/or control system 18 or portions thereof. The integrated unit may be a shelf unit and have a slender profile that is reminiscent of a conventional shelf, such as, for example, a refrigerator shelf. The integrated shelf unit may be installed in an appliance, such as a fridge, or be part of a fixture, such as a cabinet or product display.

In some instances, the control system 18 may include a wireless communication system to receive signals from a remote controller (not shown) to enable remote controlled operation of the management system 10. The remote controller may comprise, for example, a computing device communicatively coupled to the internet. In this manner, a user may communicate with the management system 10 to request reorganization of objects 12 supported thereby. Again, objects may be sorted according to one or more criteria or desired actions. A user may also communicate with the management system 10 remotely to interrogate the identity and/or state of the objects 12 supported by the system 10.

It is further appreciated that aspects of the food storage tracking systems and methods disclosed in U.S. Pat. Nos. 5,711,160 and 7,196,625 and inventory management systems and methods disclosed in U.S. Pat. No. 8,321,302 and US Patent Application Publication No. 2007/0023512 can be combined with aspects of the systems and methods disclosed herein to provide even further embodiments. All of the U.S. patents, U.S. patent application publications, U.S. patent applications, foreign patents, foreign patent applications and non-patent publications referred to in this specification and/or listed in the Application Data Sheet, including U.S. Provisional Patent Application No. 61/876,866, are incorporated herein by reference, in their entirety. Again, aspects of the embodiments can be modified, if necessary to employ concepts of the various patents, applications and publications to provide yet further embodiments.

Although the aforementioned systems 10 include functionality relating to the movement of tiles 20 using a single repositionable electromagnet, it is appreciated that in another aspect a system for repositioning objects may include a platform having a support surface upon which the objects are supported, an arrangement of electromagnets positioned beneath the platform, and a control system electronically coupled to the arrangement of electromagnets that is configured to selectively activate and deactivate the electromagnets in a sequence to impart motion to one or more of the objects. In some instances, for example, a plurality of electromagnets may be distributed in an array beneath the platform and remain stationary while controlled sequencing of the electromagnets is used to drive or otherwise move objects supported on the platform. In addition, in some embodiments, a plurality of tiles may be arranged on the support surface of the platform, and the control system may be configured to controllably rearrange the plurality of tiles on the support surface by sequencing the activation and deactivation of at least some of the electromagnets in the arrangement of electromagnets. The arrangement of electromagnets may be fixed or movable. In some instances, one or more manipulable electromagnets or an arrangement of fixed electromagnets may be used to move objects without the aid of slidable tiles.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system for repositioning objects, the system comprising:
 a platform having a support surface upon which the objects are supported;
 an electromagnet positioned beneath the platform;
 a motion system coupled to the electromagnet;
 a plurality of tiles arranged on the support surface, the plurality of tiles being arranged in a matrix of rows and columns with at least one space provided to enable rearrangement of the tiles relative to each other; and
 a control system coupled to the motion system and the electromagnet, the control system being configured to controllably move the electromagnet beneath the support surface and to selectively activate and deactivate the electromagnet in coordination with said movement to controllably rearrange the plurality of tiles on the support surface.

2. The system of claim 1 wherein each tile includes a target that is biased away or towards the electromagnet when the electromagnet is activated to enable manipulation of the tile when the electromagnet moves in proximity to the target.

3. The system of claim 1 wherein the motion system includes a carriage movable in translational directions orthogonal to each other, and wherein the electromagnet is coupled to the carriage to move beneath the plurality of tiles that are arranged on the support surface.

4. The system of claim 1 wherein the control system is configured to move the electromagnet in close proximity to a select tile and to propel or draw the tile across the support surface to reposition the tile.

5. The system of claim 1 wherein a friction reducing agent is provided between the plurality of tiles and the support surface of the platform.

6. The system of claim 1 wherein each tile includes a friction reducing arrangement on a lower surface thereof.

7. The system of claim 1, further comprising:
a plurality of tags, each tag configured to communicate wirelessly with the control system and being selectively attachable to a respective object.

8. The system of claim 7 wherein each tag includes an indicator configured to provide an indication of a quality or characteristic of the object to which the tag is attached.

9. The system of claim 8 wherein the indicator of each tag is an LED configured to emit a plurality of colors, each color indicative of a different degree or magnitude of the quality or characteristic of the object to which the tag is attached.

10. The system of claim 7 wherein the control system is configured to detect a respective location of each tag of the system that is coupled to a respective object supported by the platform.

11. The system of claim 1 wherein the control system is configured to move a tile supporting an object from a first location to a second location based at least in part on a quality or characteristic of the object.

12. The system of claim 1 wherein the control system is configured to rearrange a tile supporting an object among a plurality of tiles supporting other objects based at least in part on a comparison of a quality or characteristic of the object to a corresponding quality or characteristic of at least one other object.

13. The system of claim 12 wherein the object is a food item and wherein the control system is configured to rearrange the tile supporting the food item among the plurality of tiles based at least in part on a comparison of age or expiration data of the food item to corresponding age or expiration data of at least one other food item.

14. The system of claim 1 wherein the motion system, the electromagnet and the platform are integrated as a unit.

15. The system of claim 1 wherein the control system includes a wireless communication system to receive signals from a remote controller to enable remote controlled operation.

16. The system of claim 15 wherein the remote controller comprises a computing device communicatively coupled to the internet.

17. A system for repositioning objects, the system comprising:
a platform having a support surface upon which the objects are supported;
an electromagnet positioned beneath the platform;
a motion system coupled to the electromagnet;
a plurality of tiles arranged on the support surface, each tile including a plurality of targets each oriented in a different direction; and
a control system coupled to the motion system and the electromagnet, the control system being configured to controllably move the electromagnet beneath the support surface and to selectively activate and deactivate the electromagnet in coordination with said movement to rearrange the plurality of tiles on the support surface.

18. The system of claim 17 wherein each target is a magnet with magnetic poles oriented at an incline relative to a plane defined by the support surface.

19. A system for repositioning objects, the system comprising:
a platform having a support surface upon which the objects are supported;
an arrangement of electromagnets positioned beneath the platform; and
a plurality of tiles arranged on the support surface, and
a control system coupled to the arrangement of electromagnets, the control system being configured to controllably rearrange the plurality of tiles on the support surface by sequencing the activation and deactivation of at least some of the electromagnets in the arrangement of electromagnets.

20. An appliance or fixture comprising at least one shelf in the form of the unit of claim 14.

* * * * *